(12) United States Patent
Averbuch

(10) Patent No.: US 10,713,236 B2
(45) Date of Patent: Jul. 14, 2020

(54) SYSTEMS AND METHODS FOR ANALYSIS OF DATA STORED IN A LARGE DATASET

(71) Applicant: Panorama Software Inc., New York, NY (US)

(72) Inventor: Yaacov Avner Averbuch, Natania (IL)

(73) Assignee: Panorama Software Inc., New York, NY (US)

( * ) Notice: Subject to any disclaimer, the term of this patent is extended or adjusted under 35 U.S.C. 154(b) by 224 days.

(21) Appl. No.: 15/623,526

(22) Filed: Jun. 15, 2017

(65) Prior Publication Data

US 2017/0364551 A1 Dec. 21, 2017

Related U.S. Application Data

(60) Provisional application No. 62/350,220, filed on Jun. 15, 2016.

(51) Int. Cl.
| | | |
|---|---|---|
| *G06F 16/23* | (2019.01) | |
| *G06F 17/18* | (2006.01) | |
| *G06F 16/28* | (2019.01) | |

(52) U.S. Cl.
CPC ........ *G06F 16/2365* (2019.01); *G06F 16/288* (2019.01); *G06F 17/18* (2013.01)

(58) Field of Classification Search
CPC ..... G06F 16/2635; G06F 16/288; G06F 17/18
See application file for complete search history.

(56) References Cited

U.S. PATENT DOCUMENTS

| | | | | |
|---|---|---|---|---|
| 6,094,651 A | * | 7/2000 | Agrawal | G06F 16/283 |
| 10,129,118 B1 | * | 11/2018 | Ghare | H04L 43/08 |
| 2004/0181519 A1 | * | 9/2004 | Anwar | G06F 16/283 |
| 2013/0110761 A1 | * | 5/2013 | Viswanathan | G06N 20/00 |
| | | | | 706/52 |
| 2014/0095542 A1 | * | 4/2014 | Zelevinsky | G06F 16/26 |
| | | | | 707/776 |
| 2014/0156649 A1 | * | 6/2014 | Bhattacharjee | G06F 16/24578 |
| | | | | 707/723 |
| 2017/0359361 A1 | * | 12/2017 | Modani | H04L 63/1425 |

* cited by examiner

*Primary Examiner* — Robert W Beausoliel, Jr.

(57) ABSTRACT

According to an aspect of some embodiments of the present invention there is provided a computer implemented method for detecting at least one anomaly in a dataset, comprising: managing a dataset including a plurality of data entities each including at least one value; receiving a semantic model that defines associations between two or more data entities; forming a plurality of multi dimensional data instances, each multi dimensional data instance formed from at least one of a permutation and a combination of a set of data entities from the plurality of data entities according to the semantic model; analyzing the multi dimensional data instances to detect at least one anomalous value, the anomalous value representing a statistically significant deviation according to a deviation requirement, of one or more values from a set of values of the multi dimensional data instances; and providing the detected at least one anomalous value.

28 Claims, 6 Drawing Sheets

SYSTEMS AND METHODS FOR ANALYSIS OF DATA STORED IN A LARGE DATASET

RELATED APPLICATION

This application claims the benefit of priority under 35 USC §119(e) of U.S. Provisional Patent Application No. 62/350,220 filed Jun. 15, 2016, the contents of which are incorporated herein by reference in their entirety.

FIELD AND BACKGROUND OF THE INVENTION

The present invention, in some embodiments thereof, relates to data mining and, more specifically, but not exclusively, to systems and methods for detecting anomalies in data.

The process of anomaly detection relates to identification of data entities that do not conform to an expected pattern, or are different than other data entities in the dataset. Anomaly detection may be used to detect, for example, errors, business losses, medical problems, structural defects, security breaches in a network, and banking fraud.

SUMMARY OF THE INVENTION

According to an aspect of some embodiments of the present invention there is provided a computer implemented method for detecting at least one anomaly in a dataset, comprising: managing a dataset including a plurality of data entities each including at least one value; receiving a semantic model that defines associations between two or more data entities; forming a plurality of multi dimensional data instances, each multi dimensional data instance formed from at least one of a permutation and a combination of a set of data entities from the plurality of data entities according to the semantic model; analyzing the multi dimensional data instances to detect at least one anomalous value, the anomalous value representing a statistically significant deviation according to a deviation requirement, of one or more values from a set of values of the multi dimensional data instances; and providing the detected at least one anomalous value.

Optionally, the forming is performed for a set of multi dimensional data instances, wherein all members of each set are formed using a common permutation and/or combination and/or aggregation of data entities, wherein each member of each set includes different values for the respective data entities, and wherein the analyzing is performed for each set to detect at least one anomalous value for each set.

Optionally, the analyzing is performed automatically at predefined events to monitoring for new at least one anomalous values.

Optionally, the method further comprises instructing a rendering of a graphical user interface (GUI) for presentation on a display, the GUI presenting the detected at least one anomalous value.

Optionally, the method further comprises receiving from a user during runtime, a selection of at least one data entity for use in the forming of the plurality of multi dimensional data instances. Optionally, the selected at least one data entity is selected for a user provided period of time. Optionally, the method further comprises receiving a selection of at least one of the at least one anomalous value for follow up, and monitoring changes in the statistically significant deviation according to updates to the data entities.

Optionally, the semantic model defines one or more members selected from the group consisting of: aggregation of values of two or more data entities, hierarchical relationships between data entities, at least one attribute for respective data entities. Optionally, the method further comprises instructing a rendering of a GUI for presentation on a display, the GUI presenting the detected at least one anomalous value; receiving from a user using the GUI, a hierarchical navigation selection to a relatively lower layer or a relatively higher layer of at least one of the presented at least one anomalous value; and updating the rendering of the GUI to present another at least one anomalous value at the selected relatively lower layer or relatively higher layer.

Optionally, the hierarchical navigation selection is automatically determined by code according to a predefinition. Alternatively or additionally, the method further comprises receiving a marking for at least one anomaly at a relatively lower layer indicative of an answer to a high level problem represented by the initial anomalies; and automatically creating an association between the high level problem and the marked at least one anomaly representing the answer to the high level problem.

Alternatively or additionally, the method further comprises monitoring the marked at least one anomaly representing the answer to determine during changes to underlying values to determine whether the marked at least one anomaly represents a statistically significant answer or a statistical variation representing a false answer.

Optionally, the semantic model defines a desired or undesired state for absolute values or changes in values of data entities.

Optionally, the at least one anomalous value is detected based on a multi dimensional statistical distance according to a distance requirement, from at least a set of the plurality of multi dimensional data instances.

Optionally, the analyzing the multi dimensional data instances to detect at least one anomalous value is performed by determining the statistically significant deviation for a member selected from the group consisting of: a certain multi dimensional data instance at a current period of time and at least some of the plurality of multi dimensional data instances at a previous period of time, a certain multi dimensional data instance at a current period of time and at least some of the plurality of multi dimensional data instances at a parallel corresponding period of time, a certain multi dimensional data instance at a forecasted period of time and at least some of the plurality of multi dimensional data instances at a current period of time, a certain multi dimensional data instance at a current period of time and at least some of the plurality of multi dimensional data instances at a current period of time that was previously forecasted.

Optionally, the analyzing the multi dimensional data instances to detect at least one anomalous value is performed by determining the statistically significant deviation for a certain multi dimensional data instance relative to at least some of other multi dimensional data instances according to a hierarchical association. Optionally, the analyzing is iterated for each level of the hierarchical association, by determining the statistically significant deviation of the certain multi dimensional data instance relative to other multi dimensional data instances at the respective level and/or at one or more different levels.

Optionally, the analyzing the multi dimensional data instances to detect at least one anomalous value is performed for a certain multi dimensional data instance of a first type relative to other multi dimensional data instances of a second type, wherein the permutation and/or combination of data entities of the first type and second type are different, according to an association defined between the first type and the second type. Optionally, the association between the first type and the second type is provided during runtime by a user.

Optionally, the at least one anomalous value is selected from a set of anomalous values according to a ranking of a calculated metric representing the amount of statistically significant deviation.

Optionally, forming the plurality of multi dimensional data instances comprises selecting the set of data entities from the dataset according to a ranking score assigned to respective data entities. Optionally, the ranking score is assigned to an aggregation of two or more data entities. Alternatively or additionally, the ranking score is provided by a user during run time. Alternatively or additionally, the method further comprises creating a combination and/or permutation and/or aggregation of data entities according to a ranking requirement.

Alternatively or additionally, a respective ranking score is defined for at least one dimension of the multi dimensional data instances, wherein the at least one dimension of the multi dimensional data instances is prioritized according to the respective ranking score, and the plurality of multi dimensional data instances are formed according to the respective ranking scores of the each of the at least one dimension. Alternatively or additionally, a predefined number of values are selected for each of the at least one dimension for forming the multi dimensional data instances. Alternatively or additionally, the formation of the multi dimensional data instances is iterated according to a subset of the highest or lowest ranked dimensions to identify another subset of anomalies.

Optionally, the method further comprises selecting at least one of the at least one anomalous value, and iterating the forming and the analyzing using data entities linked to data entities of the at least one anomalous data instances. Optionally, the method further comprises rendering a GUI for navigating between the anomalous value according to the links.

According to an aspect of some embodiments of the present invention there is provided a system for detecting at least one anomaly in a dataset, comprising: a program store storing code; a data repository storing a dataset including a plurality of data entities each including at least one value a processor coupled to the data repository and to the program store for implementing the stored code, the code comprising: code to receive a semantic model that defines associations between two or more data entities; code to form a plurality of multi dimensional data instances, each multi dimensional data instance formed from at least one of a permutation and a combination of a set of data entities from the plurality of data entities according to the semantic model, and analyze the multi dimensional data instances to detect at least one anomalous value, the anomalous value representing a statistically significant deviation according to a deviation requirement, of one or more values from a set of values of the multi dimensional data instances; and code to provide the detected at least one anomalous value.

According to an aspect of some embodiments of the present invention there is provided a computer program product comprising a non-transitory computer readable storage medium storing program code thereon for implementation by a processor of a system for detecting at least one anomaly in a dataset, comprising: instructions to manage a dataset including a plurality of data entities each including at least one value; instructions to receive a semantic model that defines associations between two or more data entities; instructions to form a plurality of multi dimensional data instances, each multi dimensional data instance formed from at least one of a permutation and a combination of a set of data entities from the plurality of data entities according to the semantic model; instructions to analyze the multi dimensional data instances to detect at least one anomalous value, the anomalous value representing a statistically significant deviation according to a deviation requirement, of one or more values from a set of values of the multi dimensional data instances; and instructions to provide the detected at least one anomalous value.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
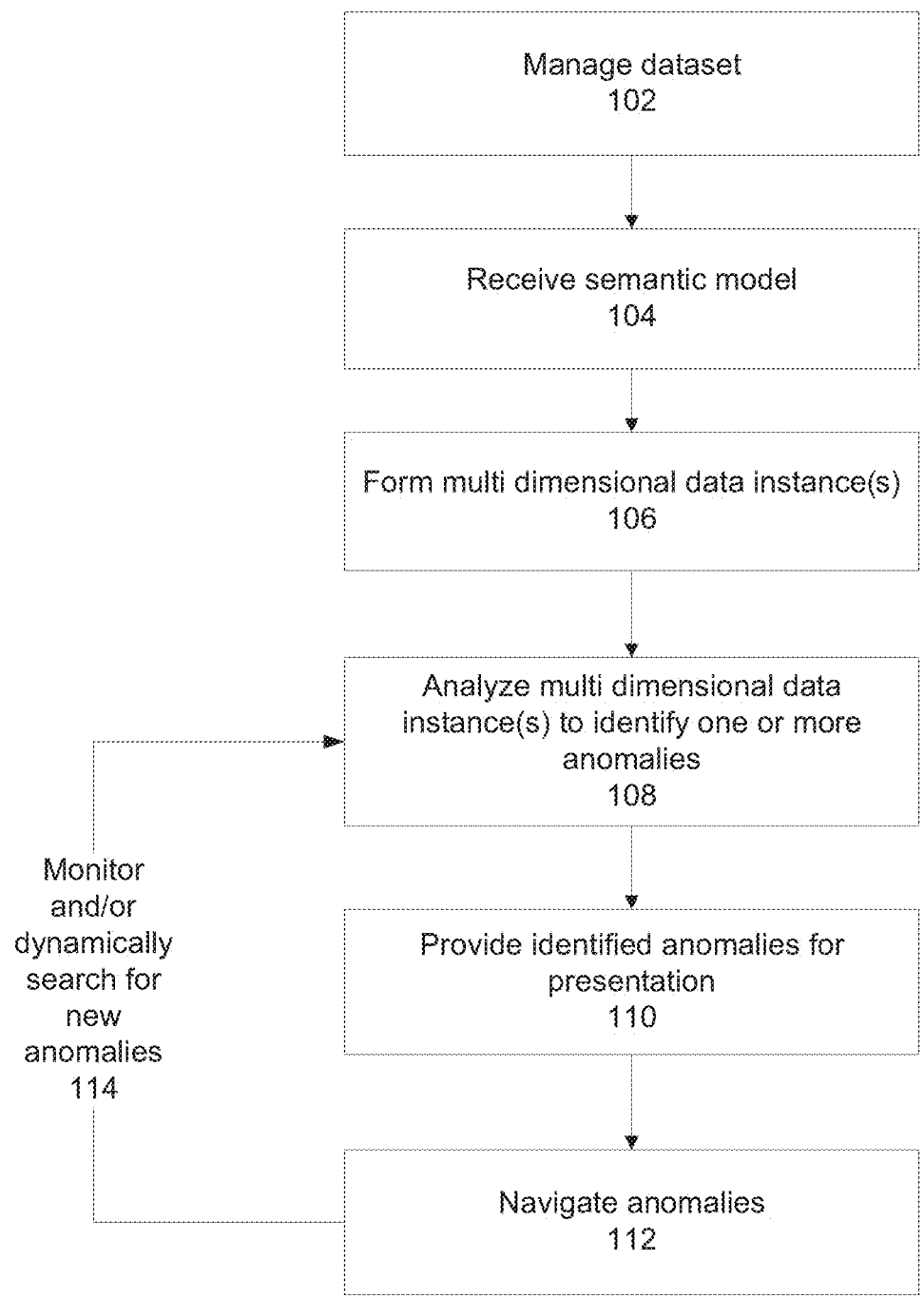
FIG. 1 is a flowchart of a method for detecting one or more anomalies in a dataset based on a semantic model, in accordance with some embodiments of the present invention.

The present invention, in some embodiments thereof, relates to data mining and, more specifically, but not exclusively, to systems and methods for detecting anomalies in data.

As used herein, the term anomaly (e.g., data anomaly, or anomalous data entity, or other similar terms) means a value of a data instance or data entity (or data entities, or data instances) that is statistically significantly different (e.g., according to a difference requirement, for example, a threshold, a range, and a function) than other corresponding values of the data entity and/or data instance.

As used herein, the term data instance includes one or more data entities. Each data entity represents a dimension within the dataset, for example, a column of data within the data set, for example, sales volume, country, and product. The data instance denotes an aggregation of one or more data entities, which may be represented as a set (or tuple) of coordinates, for example, the multi dimensional data instance (Sales, Dairy Product, Canada) defines sales for different types of dairy products sold in Canada.

As used herein, the term dimension of the multi dimensional data instances refers to a component of the multi dimensional data instance created by the permutation and/or combination and/or aggregation and/or operation applied to one or more data entities from the dataset. As used herein, the term dimension (of the multi dimensional dataset) may be interchanged with other terms used to described components of the multi dimensional dataset, for example, permutation and/or combination and/or aggregation and/or operations on data entities that form the dimensions of the multi dimensional dataset.

The dataset may be represented as a table (or other equivalent data structures), where each column represents a respective data entity, and each row includes values for the respective data entity. Data instances are formed by selection of data entities, for example, in a table of 100 columns, selection of 10 columns. Data instances are formed by permutations and/or combinations of data entities of the table.

It is noted that the dataset may be implemented as a single dataset, or a distributed dataset, dynamically organized from different tables and/or different data (e.g., stored locally on a computing unit, provided by a client terminal, and/or stored remotely on one or more remote servers). The dataset may be dynamically created by selection of different data entities from a common dataset, and/or from the distributed tables.

An aspect of some embodiments of the present invention relates to systems and/or methods (e.g., data analysis code executed by processor(s)) that detect one or more anomalies in a dataset according to a semantic model that defines associations between data entities of the dataset. One or more sets of multi dimensional data instances are formed by selecting data entities from the data set according to the semantic model and forming dimensions using the selected data entities. The members of each set share a common combination and/or permutation and/or aggregation of data entities. Each member of each set includes different values for the data entities. The semantic model defines the allowed associations between data entities, which reduces the number of allowable combinations and/or permutations and/or aggregations of data entities to a manageable size and/or defines the combinations and/or permutations and/or aggregations according to real-world and/or significant relationships. Each set is analyzed to identify one or more anomalous values (and/or anomalous data entities, and/or anomalous members) based on a statistically significant deviation according to a deviation requirement, from other members of the set. A user may dynamically navigate the anomalous values (e.g., using a GUI), as described herein. A user may dynamically select parameters for comparison to search for anomalies (e.g., using the GUI), as described herein. The anomalies may be monitored (based on changes to the underlying values) and/or new anomalies may be found, as described herein.

Optionally the dataset is large, for example, including thousands or millions of values and/or data entries. Such large datasets may be used to form an extremely large number of permutation and/or combinations using the data entities of the dataset, making identification of anomalies computationally expensive (e.g., in terms of computation time and/or hardware computation resources), for example using brute force analysis methods. The systems and/or methods described herein improve the function of a computing unit storing the dataset and/or processing the dataset, by reducing the time and/or processing resources to identify the anomalies, for example, in comparison to other methods that apply brute force methods to analyze different combinations of the data.

The analysis may be performed at predefined events (e.g., time interval, updates of the values of the data entities) to identify new anomalies, and/or track existing anomalies (e.g., to monitor whether the value of the statistical difference increases or decreases).

A GUI may be provided to present the detected anomalous values, and/or allow the user to navigate detected anomalous values (and/or other data of the dataset), and/or provide a mechanism for the user to make selection and/or enter data to control the anomaly detection process, as described herein.

The systems and/or methods described herein improve an underlying technical process within the technical field of data mining. The systems and/or methods described herein (e.g., data analysis code executed by one or more processors) relate to the technical problem of data mining to detect one or more anomalies in a dataset, optionally a large dataset, that have real-world significance. The systems and/or methods described herein allow users, which may not necessarily be data mining experts, to navigate large datasets to identify anomalies with real-world significance.

The systems and/or methods described herein address the technical problem of providing easy (or improving) user navigation of data in a large dataset to identify anomalies in the data that have real-world significance. The large number of possible permutations and/or combinations of the data present an unmanageable dataset to a user (which may not necessarily be a data mining expert) for analysis to identify anomalies (which may represent significant events, for example, business losses). The systems and/or methods described herein provide an interactive GUI that navigates the dataset according to user inputs (optionally entered in real-time), such as the user pressing one or more buttons in the GUI, and/or entering data in one or more fields of the GUI. The GUI is presented on a physical user interface, such as a display, optionally a touch-screen. The user enters data using a physical user interface, which may be the touch-screen, or a keyboard, mouse, or other physical device.

The systems and/or methods described herein improve performance of the computing unit executing the data analysis code. The improvement in performance is obtained by reducing the processing time, processing resources, and/or memory resources to identify the data anomalies. For example, although brute force methods may automatically identify anomalies by considering a large number of combinations and/or permutations of the data (which may require long running times, and/or significant processing and/or memory resources), anomalies found by such methods may not have real-world significance. Users may require significant effort to sort through the identified anomalies to determine whether the anomalies are of significance to the real-world problem, or are a data anomaly that is irrelevant to the real-world problem. In another example, the GUI allowing a user (which may not necessarily be a data expert) to navigate the large dataset to identify the data anomalies provides improved computational efficiency in finding the data anomalies, by improved targeting and/or organization of the data entities. For example, the systems and/or methods described herein improve organization of the data entities (e.g., based on significance), which allows for more effective analysis of the data, in comparison, for example, to computational methods that consider a large number of possible permutations and/or combinations of the data. In another example, the computational efficiency of the computing unit is improved, by returning results, for example, in seconds (e.g., less than 10 seconds, or 30 seconds, or 100 seconds), in comparison to other methods that require batch mode (e.g., overnight processing).

The systems and/or methods described herein may improve performance of a computing system, such as a client terminal, network, and/or network server, for example, by reducing processor utilization, reducing data traffic over the network, and/or by reducing storage requirements. Improvements may occur, for example, by the user using the GUI to navigate between different organizations of the data to identify anomalies according to real-time user entered data and/or a defined set-of-rules, as compare to, for example, a brute force method that blindly analyzes a large number of combinations and/or permutations of the data to identify an anomaly.

The systems and/or methods described herein may generate new data (which may be presented to the user on the GUI, stored, and/or transmitted to another server) that include the identification of anomalies in the data. The new data may include a documented difference between the data entity (or entities) identified as anomalous and the rest of the data. The GUI presents the results in clear real-world terms to the user, rather than for example, charts and/or complex statistical tables designed for use by data scientists.

The systems and/or methods described herein provide a unique, particular, and advanced technique of identifying anomalous entities in a dataset. The systems and/or methods described herein process data entities, to generate other new data which may be organized in a specific manner according to user definitions (as described herein).

Accordingly, the systems and/or methods described herein are inextricably tied to computer technology, to overcome an actual technical problem arising in large datasets, to identify one or more anomalies having real-world significance.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
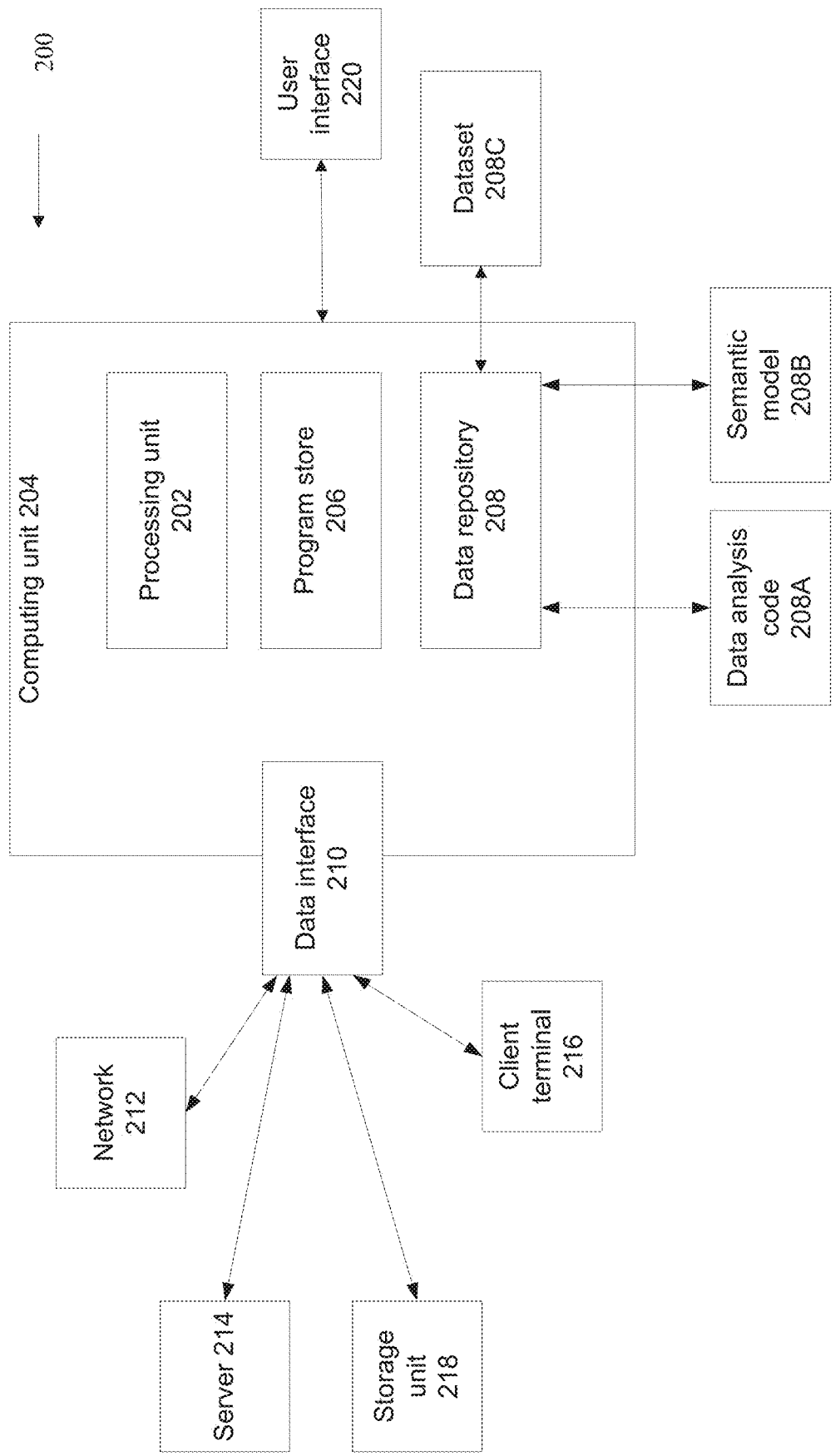
FIG. 2 is a block diagram of components of a system that allows a user to identify and/or analyze anomalies in a dataset according to a semantic model, in accordance with some embodiments of the present invention.

Reference is now made to FIG. 1, which is a flowchart of a method for detecting one or more anomalies in a dataset based on a semantic model, in accordance with some embodiments of the present invention. Reference is also made to FIG. 2, which is a block diagram of components of a system 200 that allows a user to identify and/or analyze anomalies in a dataset according to a semantic model, in accordance with some embodiments of the present invention. System 200 may execute the acts of the method described with reference to FIG. 1, for example, by a processing unit 202 of a computing unit 204 executing code instructions stored in a program store 206.

With reference to the acts of FIG. 1, the described features may be defined and/or selected, for example, by a user manually entering a definition for the feature dynamically during runtime using the GUI, retrieved from a configuration file, and/or automatically defined by code. The user may dynamically adapt one or more of the features described herein (e.g., using the GUI) to dynamically search and/or explore anomalies at different aspects of the data. For example, to dynamically change one or more data entities used for comparison for identification of anomalies, and compare the resulting anomalies.

The systems and/or methods described herein (e.g., data analysis code executed by one or more processors) allow users, which may not necessarily be data scientists or other data mining professionals, to navigate large datasets to identify anomalies in the data. Users may explore various areas of the data entities to identify anomalies, by varying one or more parameters, as described herein. The results are visually presented to the user, optionally within a graphical user interface (GUI), in clear business terms, which are better understood by the user, rather than, for example, charts or complex statistical tables that are designed for use by data scientists. Users may follow up on anomalies to determine changes over time, and/or fixes.

Computing unit 204 may be implemented as, for example, a client terminal, a server, a computing cloud, a web server, a mobile device, a desktop computer, a thin client, a Smartphone, a Tablet computer, a laptop computer, a wearable computer, glasses computer, and a watch computer. Computing unit 204 may include locally stored software that performed one or more of the acts described with reference to FIG. 1, and/or may act as one or more servers (e.g., network server, web server, a computing cloud) that provides services (e.g., one or more of the acts described with reference to FIG. 1) to one or more client terminals, for example, providing software as a service (SaaS) to the client terminal(s), providing an application for local download to the client terminal(s), and/or providing functions using a remote access session to the client terminals, such as through a web browser. For clarity, computing unit 204 is shown as a single component, but it is understood that computing unit 204 may be implemented using other architectures, such as the client-server design.

Processing unit 202 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processing unit(s) 202 may include one or more processors (homogenous or heterogeneous), which may be arranged for parallel processing, as clusters and/or as one or more multi core processing units.

Program store 206 stores code instructions implementable by processing unit 206, for example, a random access memory (RAM), read-only memory (ROM), and/or a storage device, for example, non-volatile memory, magnetic media, semiconductor memory devices, hard drive, removable storage, and optical media (e.g., DVD, CD-ROM).

Computing unit 204 may include a data repository 208 for storing data, for example, data analysis code 208A (that performs one or more acts of the methods described with reference to FIG. 1), and/or semantic model 208B (that is used by the data analysis code, as described herein), and/or dataset 208C (that stores data entities being analyzed for anomalies, as described herein). Data repository 208 may be implemented as, for example, a memory, a local hard-drive, a removable storage unit, an optical disk, a storage device, and/or as a remote server and/or computing cloud (e.g., accessed using a network connection).

Computing unit 204 may include a data interface 210, for example, one or more of, a network interface card, a universal serial bus (USB) connector, a wireless interface to connect to a wireless network and/or storage device, a physical interface for connecting to a cable for network connectivity, a virtual interface implemented in software, network communication software providing higher layers of network connectivity, and/or other implementations.

Computing unit 204 may connect using data interface 210 and/or network 212 (and/or another communication channel, such as through a direct link (e.g., cable, wireless) and/or indirect link (e.g., via an intermediary computing unit such as a server, and/or via a storage device) with one or more of: a server(s) 214, client terminal 216 (e.g., when computing unit 204 acts as a server, for example, provided SaaS), and a storage unit 218 (e.g., a storage server, a computing cloud storage server, which may store dataset 208C or portions thereof).

Computing unit 204 includes or is in communication with a user interface 220 allowing a user to enter data and/or view presented data. Exemplary user interfaces 220 include, for example, one or more of, a touchscreen, a display, a keyboard, a mouse, and voice activated software using speakers and microphone.

Referring now back to FIG. 1, at 102, a dataset including data entities is managed. Each entity includes one or more value. The dataset may be a large dataset, for example, including at least 100 columns (i.e., when implemented as a table), at least 1000 columns, at least 10000 columns, or other number of columns. The dataset may include, for example, at least 100 000 values, at least 1 million values, at least 10 millions values, at least 100 million values, or other number of values. The dataset may represent, for example, business data, sales figures, population demographics, logistical operation data, blood test results, or other large data collections.

At 104, a semantic model that defines associations between two or more data entities of the dataset is received and/or derived automatically from data using analysis code executed by a processor(s). The semantic model is designed to allow a user (which may not necessarily be a data scientist or other data mining expert), to identify significant and/or important insights in the dataset, for example, business critical events, fraud, disease patterns, or other events which may be hidden in the data. The semantic model is designed to provide a mechanism to define an abstraction of the underlying complex and large dataset and relationships between different data entities of the dataset. The semantic model is used as a basis to guide efficiency computations to identify anomalies within the dataset, as described herein. The semantic model is designed to allow a user to use a GUI to identify anomalies using simple instructions and/or using simple output which may be understood by a user, for example, using business terms, or terms used by the domain (e.g., medical, demographic) without necessarily using data mining jargon. The semantic model allows creation of computationally efficiency search methods that may adapt to multiple datasets, which may not necessarily require manual adaptation of the data. The semantic model may be defined independently of the underlying dataset, which may allow the semantic model to be used with different dataset, for example, defining a relationship between a first column storing sales and a second column storing number of employees may be used to analyze datasets that include such columns.

For example, the semantic model may define associations between values of data entities representing different cities and/or other geographical distributions. In another example, the semantic model may define associations between data entities representing different products. In another example, the semantic model may define associations for different periods of time. In yet another example, the semantic model may define associations to explore data entities which may be unrelated, for example, a hospital mortality rate, departments in the hospital, and human resources scheduling parameters.

The semantic model may include a definition associated with one or more data entities (and/or with aggregation of two or more data entities, and/or with an operation function applied to the data entities) that indicates whether the absolute values of the data entities denote a desired state or undesired state (and/or other sentiments), and/or when changes in values of the data entities represent a tendency towards the desired state and/or when changes in values of the data entities represent a tendency towards the undesired state. Each data entity may be associated with both a definition for the desired and undesired state, or one definition for the desired or undesired state. For example, an increase in the value of a sales data entity denotes a desired state, with larger increases tending towards more desired states. In another example, a decrease in the value of sales denotes the undesired state. In yet another example, a decrease in a value of a data entity denoting customer attrition denotes the desired state. In another example, absolute values of the customer attrition data entity may represent a desired state, regardless of value (i.e., an attrition is undesired), or an increase in the value of the customer attrition data entity denotes the undesired state (i.e., the more attrition the more undesired). The association with the desired and/or undesired states may be performed, for example, manually by the user, and/or automatically by code, for example, using a set-of-rules that maps desired and undesired states to keywords that are pattern matched to similar data entities of the dataset (e.g., according to a similarity requirement).

The semantic model may be implemented, for example, as a set-of-rules, as a function, as a set of values for predefined parameters, as an algorithm (e.g., code executed by a processor), as a manually defined relationship. The semantic model may be static and/or dynamic. The semantic model may define relationships between two or more entities of the dataset. The semantic model may define an aggregation (e.g., a set-of-rules for aggregation) of values of two or more data entities, for example, for a column representing sales and another column representing number of employees in a store, the semantic model may define sales volume per employee. The semantic model may define a hierarchical relationship between two or more data entities, for example, a column representing total sales of Smartphones may be mapped at a higher layer relative to columns storing sales figures of specific brands of Smartphones. The hierarchical relationships may define associations, which may be used to aggregate values of the data entities, for example, data entities of geography mapped to lower layers (e.g., each data entity at a lower layer than the previous data entity) of data entities of countries, data entities of states, data entities of cities. In another example, data entities of products may be mapped to lower layers of categories, and subcategories. The semantic model may define hierarchies of dates, for example, year, quarter, month, and day, which may be obtained from date data entities. The semantic model may define at least one attribute for respective data entities, for example, data entities (e.g., columns) may be associated with a specific type, for example, customer, product, city, and country. The semantic model may define relationships between measures and other data entities, for example, mathematical operation to perform on the values in the data entity, for example, for a data entity storing total sales of a certain product at a certain city for a year, the values may be divided by the number of days in a year, to obtain an average daily sales number (when the number of days in the year is not necessarily stored as a data entity).

The semantic model may be defined prior to execution of the rest of the acts of FIG. 1, for example, the semantic model may be initially defined and used subsequently by multiple users and/or during multiple sessions. The semantic model may be updated.

The semantic model may be received, for example, from a user (e.g., manually entered using a GUI, and/or a programmed as code and/or entered as a set-of-rules, or other implementation), as code (e.g., pseudocode, text based, compiled code), or other implementations.

The user may manually provide, during runtime, one or more data entities for use in the forming of the multi dimensional data instances (as described below). Optionally, the selected data entity is selected for a user provided period of time.

At 106, multi dimensional data instances are automatically formed. Each multi dimensional data instance is formed from a permutation and/or a combination and/or aggregation of two or more data entities from the data entities according to the semantic model.

The multi dimensional data instances may include unaltered (i.e., raw) values obtained from the dataset, and/or processed data based on the dataset (which may not necessarily be stored in the same form in the dataset) such as values calculated from an aggregation.

The formation may be performed to create sets of multi dimensional data instances, wherein all members of each set are formed using a common permutation and/or combination and/or aggregation of data entities. Each member of each set includes different values for the respective data entities. The analysis (as described herein) is performed for each set, to detect anomalous value(s) for each set. The multiple sets allow identification of anomalies in different contexts and/or different domains, optionally in parallel (e.g., each set may be processed by a different cluster or core), which improves performance of the computing system.

Optionally, a sample of the multi dimensional data instances are selected for analysis. The sample may be a statistical representation of the larger set of values of the dataset. The sample may be based on the aggregation of data entities according to the semantic model, to account for data that is not directly stored in the dataset but used in the analysis (as described herein). The sampling improves computational efficiency of the computing unit, by reducing the processing time and/or processing resources.

Optionally, the sampling is based on a selecting a set of data entities from the dataset according to a ranking score assigned to respective data entities. The ranking score is indicative of the move relevant and/or significant data entities for analysis, for example, according to the current context and/or problem being analyzed. For example, for a business, the data entity representing sales may be ranked highest. The ranking score may be dynamically provided by a user during run time (e.g., using the GUI), retrieved from a configuration filed, and/or automatically determined by code.

The ranking score may be assigned to an aggregation of two or more data entities according to the semantic model, to include data not directly stored in its raw form in the dataset.

The ranking score may be defined, for example, by a user manually entering a definition for the ranking score dynamically during runtime using the GUI, retrieved from a configuration file, and/or automatically defined by code.

The ranking score may be calculated according to values of the data entities. For example, for each data entity, the members (i.e., values) may be ranked. In another example, for each formed multi dimensional data instance, the members (i.e., data entities) may be ranked. For example, all cities in a geography may be ranked to identify the top (or bottom) cities (e.g., the top 100 or 1000 cities, or other value). The ranking may be performed by creating a combination and/or permutation and/or aggregation of data entities (and/or data values) according to a ranking requirement, for example, rank the cities by a ratio of sales of a current time period to a previous time period, for example, resulting in +45% for Seattle and −20% for New York.

Optionally, the multi dimensional data instances are formed by a permutation and/or combination process using data entities according to the ranking scores. The process may continue until a stop condition is met, for example, detection of a certain number of anomalies, and/or creation of a certain number of multi dimensional data instances. The stop condition may be defined, for example, by a user manually entering the stop condition dynamically during runtime using the GUI, retrieved from a configuration file, and/or automatically defined by code.

Optionally, the highest ranking multi dimensional data instances are selected for further analysis (and/or presentation to the user for navigation).

Alternatively or additionally, ranking scores are defined for one or more dimensions of the multi dimensional dataset (e.g., each dimension is associated with a respective ranking score). The ranking scores may be common or similar or different for the different dimensions. The dimensions may be prioritized according to the ranking score, for example, selecting the top (or bottom) 200 values for each of 10 dimensions according to the respective ranking score. The values of the dimensions may be selected based on the permutation and/or combination process, which may be defined per dimension, for example, select the top predefined number of values per dimension, select the top 100 from the first dimension, select the top 55 from the second dimension, and select the top 35 from the third dimension, for example, according to a permutation and/or combination limit (e.g., 10 million). The ranking of the formed multi dimensional dataset may be performed as described herein. The anomalies found for the permutations and/or combinations (as described herein) may be used as a basis for iterations to identify additional anomalies, for example, the top 50 anomalies or 100 anomalies (or other numbers) may be re-analyzed using the ranking scores to identify a smaller subset of anomalies (i.e., anomalies within the anomalies).

At 108, the multi dimensional data instances are analyzed to detect anomalous value(s). The anomalous value(s) represent a statistically significant deviation of value(s) from a set of values of the multi dimensional data instances. The statistically significant deviation may be determined according to a deviation requirement, which may be absolute and/or dynamic and/or relative, for example, a threshold, a range, and a function. The statistically significant deviation may be calculated, for example, as a statistical distance, as a correlation representing similarity, as a difference between values, or other methods.

The definition of the statistically significant deviation may be obtained dynamically from a user using the GUI. For example, the user may define searching for extreme anomalies, by defining anomalies as being statistically very far from the rest of the values. In another example, the statistically significant deviation may be automatically calculated by code according to user navigation of the data using the GUI. For example, when the user navigates to relatively higher or lower layers of a hierarchy (as described herein), new anomalies may be found at the higher or lower layers based on statistically significant deviation relevant to the values at the layer being navigated. In another example, the statistically significant deviation may be a relative value, for example, the 20 most significant anomalies. In another example, the statistically significant deviation may be stored in a configuration file (e.g., manually pre-defined by an administration and/or automatically defined by code). The analysis may be performed for each set, to identify anomalous value(s) per set of multi dimensional data instances.

The analysis may be performed to detect desired (e.g., good) anomalies, for example, an increase in sales. The analysis may be performed to detect undesired (e.g., bad) anomalies, for example, a decrease in sales.

The analyzing of the multi dimensional data instances to detect anomalous value(s) may be performed by determining the statistically significant deviation according to one or more methods, as follows:

Time based analysis, based on comparison of values of different time periods, for example, using a ratio, and/or a difference. The comparison may be performed for corresponding values at the different periods of time.
Exemplary time based comparisons include:
Values of multi dimensional data instance(s) at a current period of time compared to values of multi dimensional data instances at a previous period of time.
Values of multi dimensional data instance(s) at a current period of time compared to values of multi dimensional data instance(s) at a parallel corresponding parallel period of time.
Values of multi dimensional data instance(s) at a forecasted period of time compared to values of multi dimensional data instance(s) at a current period of time. The forecast may be calculated, for example, using a trend line based on previous period(s) of time.
Values of multi dimensional data instance(s) at a current period of time compared to values of multi dimensional data instance(s) at a current period of time that was previously forecasted. The forecast may be calculated, for example, using a trend line based on previous period(s) of time.
The forecasted trend line(s) may be compared, for example, by comparing slopes.
Hierarchical based analysis, based on comparison of values of hierarchical relationship, such as parent-child relationships, and/or relationships along three of more levels. The comparison may be performed for values at the same level and/or at different hierarchical levels. For example, for a certain product, the hierarchical relationship defines a product family, for example, a certain Smartphone may be analyzed relative to other Smartphones, or a customer of a certain age may be analyzed relative to the demographic group based on a range of ages including the customer's age. The hierarchical analysis may be used to compare a certain value to other values of the family of the certain value (e.g., the parental level), for example, if members of the family increased in sales by 20% during a time period defined as A-B, and sales of a certain product in the family decreased by 50%, an anomaly may be flagged. The hierarchical analysis may be performed with one or more higher layers above the value being analyzed.
The hierarchical analysis may be performed with the time based analysis, for example, a comparison of a forecast of a price for a certain product compared to a forecast of a price for a family of the certain product.
Correlation based analysis, for multi dimensional data instance(s) of a first type relative to other multi dimensional data instance(s) of a second type. The permutation and/or combination and/or aggregation of data entities of the first type and second type are different. The analysis may be performed according to an association defined between the first type and the second type, which may be provided during runtime by a user, for example, using the GUI. The correlation analysis may be performed for one or more periods of time. Examples of correlation analysis include: comparison of values of actual costs to a forecasted budget, comparison of sales to costs, comparison of a promotion of a 10% discount to no promotion, and comparison of one product to another.

At 110, the detected anomalous value(s) are provided, for example, for storage, for transmission to a remote computing unit, for use by another process, and/or for presentation to a user.

Optionally, a rendering of a GUI is instructed for presentation on a display associated with a computing unit used by the user, for example, within a web browser, a mobile application, or other methods. The GUI presents the detected anomalous value(s), and/or may allow a user to navigate the results (as described herein).

The anomalous value(s) may be selected from a set of anomalous values according to a ranking of a calculated metric representing the amount of statistically significant deviation. The anomalous value(s) may be selected for presentation within the GUI according to the ranking value, for example, the top ranked anomalous value(s).

At 112, the user navigates between the anomalous data instances, optionally using the GUI. The navigation may be performed according to the links that represent hierarchical relationships between the anomalous data instances.

Optionally, the user may select to increase the ranking weight of one or more data entities, of the anomalous data instances and/or the multi dimensional data instances, for example, increasing by a factor of 10. The analysis may be iterated using the adjusted ranking weight, and the GUI may be updated with changes to the previously identified anomalies. For example, new anomalies may be identified, and/or the values of the earlier anomalies may change.

Anomalies may be presented according to a hierarchy. Optionally, anomalies at the highest level are presented (e.g., for a toy product family, or for a country). The user may use the GUI to select lower levels of the hierarchy of the anomaly, for example, anomalies for dolls, and/or anomalies for France.

Instructions for rendering of the GUI for presentation of the detected anomalous value(s) are generated for an initial hierarchical layer (or initial location within a graph and/or other links). The user uses the GUI to navigation between the hierarchical layers, to relatively lower layers and/or to relatively higher layers, and/or along other links. At each layer (or link) the GUI is updated with the detected anomalies at the current layer. The anomalies at the different layers may be dynamically determined (e.g., according to the layer being navigated) and/or anomalies identified in an earlier processing act may be presented according to the respective layer being navigated. Additional details are discussed with reference to FIG. 3.

Alternatively or additionally, the navigation is automatically performed by software. Code may identify the most significant anomaly at each level (e.g., based on highest statistical distance) and automatically trigger rendering of the next hierarchical level. The process may iterate for all levels, or a subset of predefined levels, for example, down 3 layers.

Alternatively or additionally, the user marks one or more anomalies using the GUI as answers to a question and/or problem (e.g., a business question, an operations problem, a research question) used to generate the initial set of anomalies. The one or more anomalies marked as answers may be at a lower layer (or other link relationship) relative to the higher level initial set of anomalies generated according to the problem (e.g., based on the semantic model and/or user entered data and/or use navigation). The relationship between the high level problem denoted by the higher layer anomalies and the answer denoted by the selected anomalies at the lower layer(s) may be used to create a set-of-rules, heuristics, mappings, statistical classifier (or other methods) to link between the question and answers. Links between questions and unexpected answers may be found. A set of questions and answers may be collected (e.g., stored in a storage device as records, code, functions, or other representations) for use by different users, allowing different users to explore similar answers to similar questions. For example, a user may wish to explore mortality within a network of hospitals. The higher level anomalies may indicate that a certain hospital in a certain city is experiencing a higher level mortality. A lower layer may indicate increased mortality in particular in the emergency room. A relatively lower layer may indicate increased mortality during a certain shift change. A relatively lower layer may indicate increased mortality that started during a change in scheduling policy by human resources. The scheduling policy, which may not have been discovered without the GUI (i.e., association between scheduling and mortality is not obvious, but linked through multiple layers) may be marked as an answer to the problem.

At 114, a selection of anomalous value(s) is received for follow up, for example, by the user using the GUI to mark one or more anomalous values. The anomalies marked for follow up may include the anomalies identified as answers to the problem (e.g., as discussed in block 112). Tracking the answers to the problems allows the user to verify whether the answer is a real answer (i.e., statistically significant) or statistical variation (i.e., false answer). For example, when the same or similar answers are consistently provided for the problem, for example, over time and/or with changes to underlying data, the answer may be determined to be a true, or statistically significant answer. Alternatively or additionally, the user may select an option for automatic monitoring of new anomaly value(s). Alternatively or additionally, or one more features are dynamically adapted by the user, for example, data entities used for comparison as part of a user search process to find anomalies. Blocks 108-112 are iterated to present the newly found anomalies.

The selected anomalous value(s) may be monitored to identify changes in the statistically significant deviation based on updates to the data entities. The updated values of the data entities of the anomalous value(s) may due to changes in existing values, deletion of existing values, and/or adding of new values.

The analysis (e.g., block 108) may be performed automatically at predefined events to monitoring for new value(s), and/or changes to existing anomaly value(s). For example, triggered by updates to data entity components of the multi dimensional components of the anomaly value(s), randomly, and/or at predefined times (e.g., daily, weekly).

The process of automatically monitoring for anomalies may include formation of new multi dimensional data instances, which may be formed by iterating the formation of multi dimensional data instances according to updates of the dataset. Updates to the dataset may trigger automatic formation and/or updating of the multi dimensional data instances according to the semantic model. The updated multi dimensional data instances may be analyzed to identify new anomalies removal of existing anomalies, and/or changes to anomalies.

Exemplary usage scenarios of the systems and/or methods (e.g., code instructions executed by processor(s) of a computing unit) are now described. In a first scenario, a user uses a GUI to select to see the lowest (i.e., worst) anomalies for a time period defined for the last month. The user uses the GUI to navigate the presented anomalies, for example, by changing the period of time (e.g., last year, last quarter, last month, or another time rang), by changing the ranking method used to rank the anomalies and/or the data entities, and/or by selecting data entities that must be used in forming the multi dimensional data instances (that are analyzed to identify the anomalies, as described herein) for example, selection of only Germany OR France, and only for the Smartphone family. The user may select one or more anomalies for follow up, for example, by using the GUI to drag and drop an icon representing the anomaly into a follow-up pane, where the values of the anomaly are dynamically updated according to updates of the values of the dataset corresponding to components of the anomaly. For example, the user may see how data for the last month changes (as new data arrives), and/or how the statistical deviation from last year changes.

In another scenario, the user selects to analyze a sales model that includes 100 million data values. The user may use a GUI to select the most statistically significant anomalies (e.g., highest deviation value), which may draw light on totally unexpected areas for further investigation. The user may use the GUI to enter additional data to guide the formation of the multi dimensional data instances, for example, data according to a user profile and/or interests. For example, a large dataset may store data for a company. Different users in different departments may access the common dataset to analyze problems related to their context, for example, field services, customer service, installation, sales, and accounting. The customization may draw light on totally unexpected problems related to the user for further investigation.

The GUI may display an anomaly indicative of a large decline in sales for the toys product family in Seattle. The user may select the insight using the GUI, to identify additional anomalies according to the hierarchy of the identified parent anomaly, for example, using Sales, Seattle, and Toys. Multiple anomalies may be detected at the lower levels, for example, by forming and/or analyzing multi dimensional data instances at the lower levels. The anomalies at the multiple hierarchical levels may be automatically updated, for example, daily as the dataset is updated. The user may navigate the anomalies at the hierarchies, to investigate anomalies at each level. The user may select one or more anomalies at each level for monitoring. The user may save the created navigation pattern for future use, to obtain a high level picture of what is happening (e.g., in the business).

Alternatively or additionally, the user marks one or more anomalies as answers to a question (e.g., a business question, an operations question, a research question).

Figure 3:
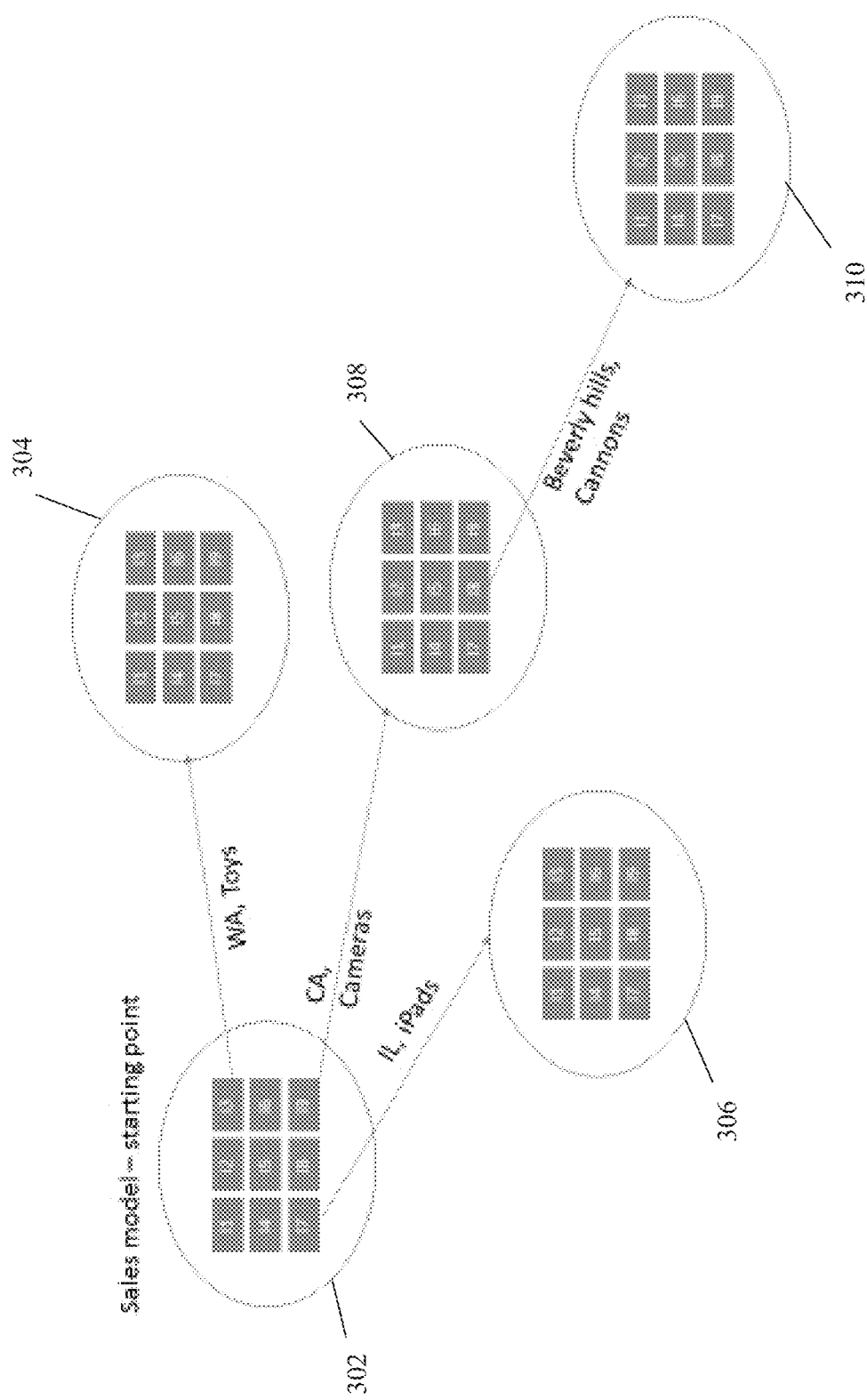
FIG. 3 is a schematic depicting navigation of one or more identified anomalies, in accordance with some embodiments of the present invention.

Reference is now made to FIG. 3, which is a schematic depicting navigation of one or more identified anomalies (e.g., using the GUI), in accordance with some embodiments of the present invention. Widget 302 represents anomalies identified for a large sales dataset, for example the top 9 anomalies for a dataset of a large nationwide chain of department stores. The user may select one or more anomalies for further investigation, for example, by analyzing hierarchical relationships, by viewing anomalies at lower levels. For example, Widget 304 presents the top 9 anomalies found for the toy family in Washington, which may represent lower levels relative to the anomalies of widget 302. Widget 306 depicts anomalies found for the iPads family in Illinois. Widget 308 depicts anomalies found for the cameras family in California. From widget 308, the user may navigate a lower layer, for example, anomalies found for the Cannon® brand in Beverly Hills.

Figure 4:
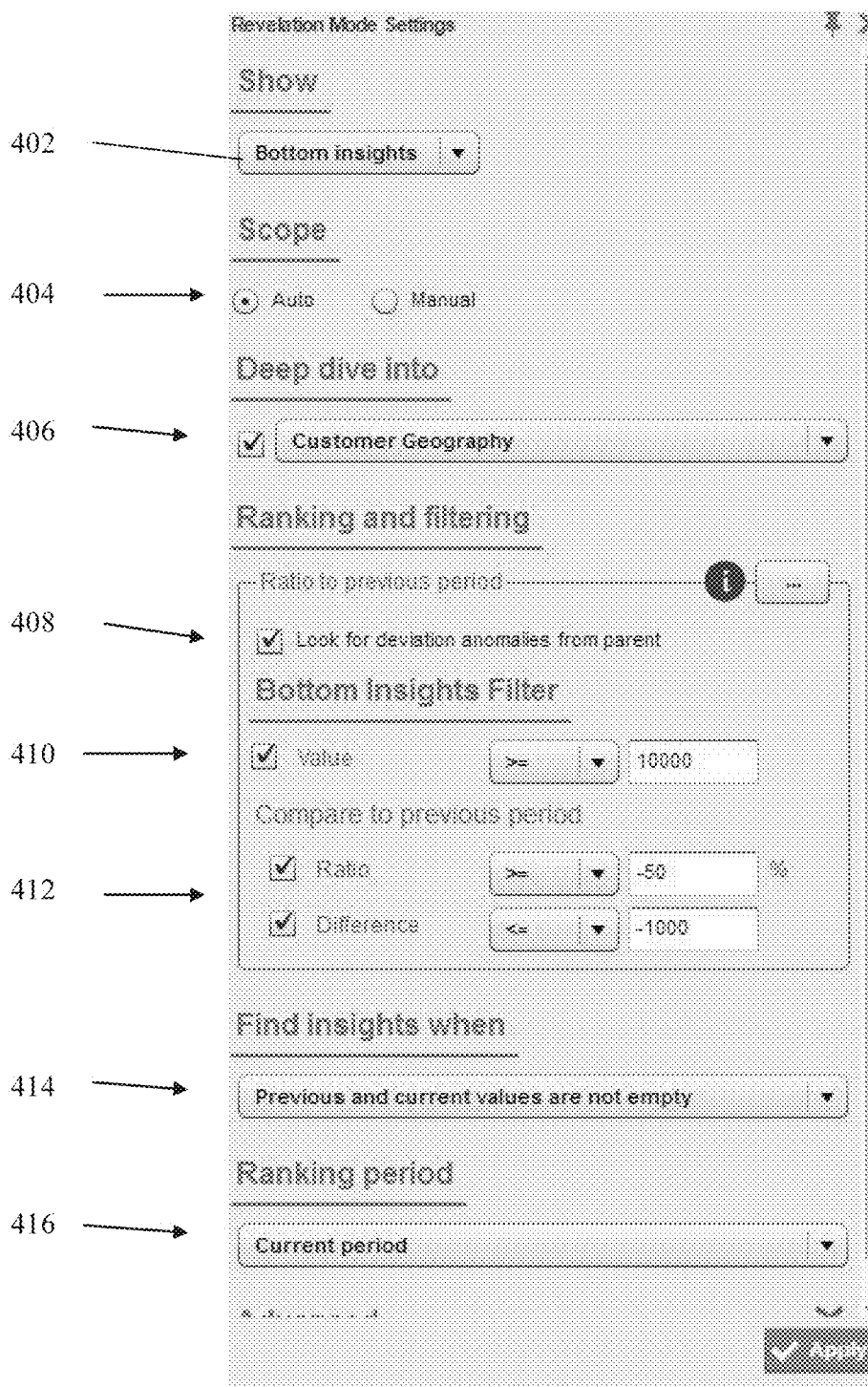
FIG. 4 is a schematic depicting an exemplary graphical user interface (GUI) that allows the user to define preferences and/or selections for detection of anomalies, in accordance with some embodiments of the present invention.

Reference is now made to FIG. 4, which is a schematic depicting an exemplary GUI that allows the user to define preferences and/or selections for detection of anomalies, in accordance with some embodiments of the present invention. Icon 402 allows the user to select to view the lowest ranked anomalies (e.g., largest deviation values). Icon 404 allows the user to select automatic or manual guided analysis. Icon 406 allows the user to define one or more data entities that must be included in the identified anomalies. Icon 408 allows the user to define hierarchical anomalies by looking for deviations from the parent values. Icon 410 allows the user to define a filter for values. Icon 412 allows the user to define a minimum value that defines anomalies based on a comparison with other values. Icon 414 allows the user to define additional parameters for identification of anomalies. Icon 416 allows the user to define a time period for analysis and identification of anomalies.

Figure 5:
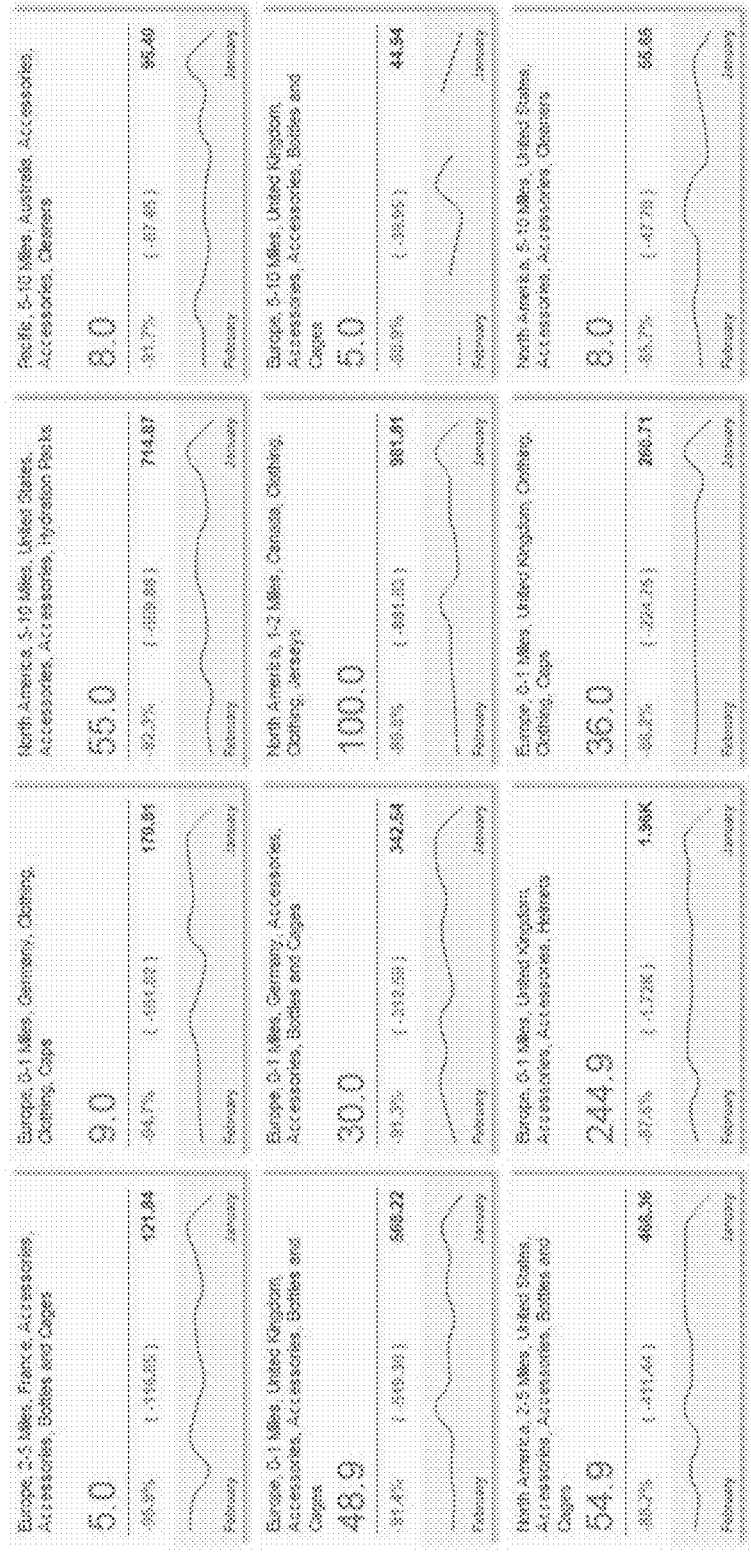
FIG. 5 is a schematic depicting an exemplary GUI that presents identified anomalies, in accordance with some embodiments of the present invention.

Reference is now made to FIG. 5, which is a schematic depicting an exemplary GUI that presents identified anomalies, in accordance with some embodiments of the present invention. Each identified anomaly may be presented within a respective icon (one icon 502 shown for clarity). Each icon may present underlying information of the respective identified anomaly, for example, the data entities of the multi dimensional data instance(s) of the anomaly, statistical deviation based on one or more defined comparison methods, monitored patterns over time, and/or other methods, as described herein. The anomalies may be defined as undesired anomalies, for example, declines in sales.

Figure 6:
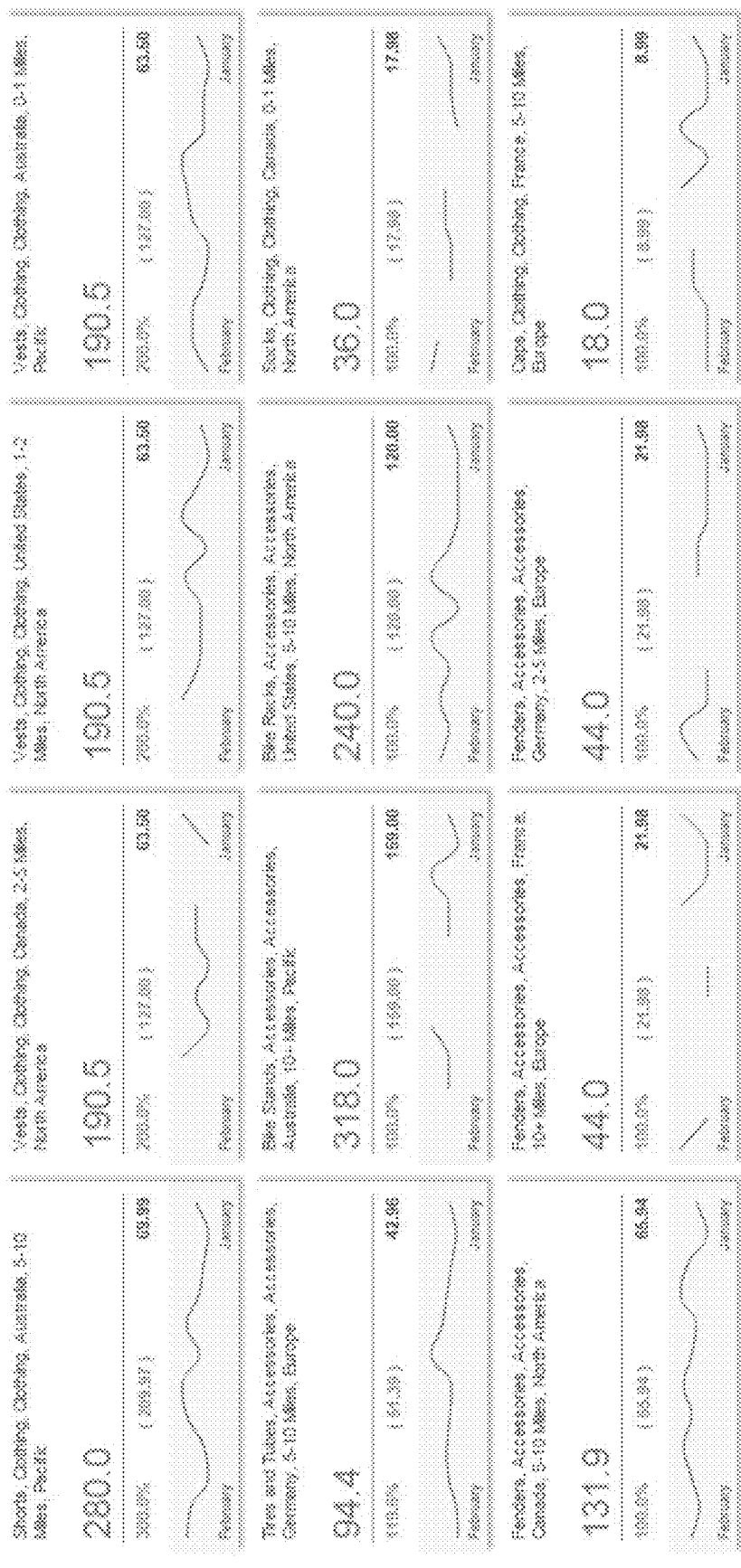
FIG. 6 is another schematic depicting an exemplary GUI that presents identified anomalies, in accordance with some embodiments of the present invention.

Reference is also made to FIG. 6, which is another schematic depicting an exemplary GUI that presents identified anomalies, in accordance with some embodiments of the present invention. The icons of FIG. 6 represent anomalies defined as desired anomalies for example, increases in sales.

Exemplary components (e.g., widgets, buttons, data entry fields, slide button, selections) of a GUI for presenting and/or navigating abnormalities identified in a dataset are now described. The components may provide the user with control functions to adapt the mechanism of searching for abnormalities, as described herein. The components described below may represent default values. The GUI components may be defined, for example, using an Extensible Markup Language (XML) file, which may be used as a template and loaded and/or rendered, for example, using a web browser or other application installed on a client terminal or other computing unit.

1. Sentiment—caption—'Show'
    a. Good (e.g., desired anomalies)—use topcount—caption—'Top insights'
    b. Bad—(e.g., undesired anomalies) use bottom count—caption—'Bottom insights'
    c. Both—both
2. Scope
    a. Radio buttons
        i. Auto—default—when selected, change enabled attribute to 'False'
        ii. Manual—when selected show the textbox and command button below
    b. Show a listview with ellipsis
        i. Show in listview two columns
            1. Dimension
                a. Dimension caption
            2. Use members at level
                a. Level caption
        ii. Ellipsis opens a dialog to select dimension from box a to the right list. For each dimension the user may select one or more hierarchical levels (UI may be similar to the VI hide members dialog)
            1. When a dimension is selected from the box a and does not exist in the view, the computing unit (e.g., server) may add to slicers behind the scenes
3. DeepDiveDimension (e.g., explore associations, for example, lower hierarchical levels)
    a. Caption—Deep dive into
    b. Checkbox to enable the drop down
    c. Drop down
        i. When scope is auto, list all dimensions in slicer\grid
        ii. When scope is not auto, show only selected dimensions in scope
    d. Implications of deep dive attribute
        i. Do it first
        ii. Take DimFilterMax*10
        iii. Select all pnBot\pnTop member into combinations of other dimensions for the nonempty
4. ByMeasure
    a. Caption—Select Insight value
    b. Checkbox—Enabled
    c. Drop down to select a measure
    d. Show this UI only if measures in the grid
5. CompareMethod—caption—'Rank by'
    a. PrevPeriodRatio—compare to previous period by ratio
        i. Caption—Ratio to previous period
        ii. Description—Ratio between current period and previous period
    b. PrevPeriodDelta—compare to previous period by delta
        i. Caption—Difference from previous period
        ii. Description—Difference between current period and previous period
    c. ParallelPeriodRatio—compare to parallel period by ratio
        i. Caption—Ratio to parallel period
        ii. Description—Ratio between current period and parallel period of last year
    d. ParallelPeriodDelta—compare to parallel period by delta
        i. Caption—Difference from parallel period
        ii. Description—Difference between current period and parallel period of last year
    e. LinRegRatio—compare to estimated current period based on regression of prey periods (by ratio)
        i. Caption—Ratio to current period prediction ii. Description—Ratio between current period and the predicted value of the current period using a trend line of past periods
  f. LinRegDelta—compare to estimated current period based on regression of prey periods (by delta)
    i. Caption—Difference from current period prediction
    ii. Description—Difference between current period and the predicted value of the current period using a trend line of past periods
  g. LinRegForecastRatio—compare estimated future period (based on regression) to current period (by ratio)
    i. Caption—Ratio to prediction
    ii. Description—Ratio between predicted period based on trend line of past period, and the current period
  h. LinRegForecastDelta—compare estimated future period (based on regression) to current period (by delta)
    i. Caption—Difference from prediction
    ii. Description—Difference between predicted period based on trend line of past period, and the current period
  i. LinRegTrendLineSlope
    i. Caption—Deepness of decline or rise of the trend line
  j. TupleRatio—compare to tuple by ratio
    i. Caption—Ratio between two values
    ii. Description—Ratio between two values, e.g., Actual vs. budget, No discount vs. with discount, Sales vs. cost
  k. TupleDelta—compare to tuple by delta
    i. Caption—Difference between two values
    ii. Description—Difference between two values, e.g. Actual vs. budget, No discount vs. with discount, Sales vs. cost
  l. TupleCorrelation—look for correlation between two data cells across time
    i. Caption—Two values correlation
    ii. Description—Correlation between two values, e.g., Actual vs. budget, No discount vs. with discount, Sales vs. cost across time
  m. Value—take best\worst by value size (mostly relevant when there is no time dimension)
    i. Caption—Current value
    ii. Description—Rank by data values
6. CompareToParent
  a. Checkbox
  b. Caption—Look for deviation anomalies from parent
  c. Show item if one of the following ranking methods was selected
    i. Relevant for PrevPeriodRatio, ParallelPeriodRatio, LinRegRatio, LinRegForecastRatio, Tuple ratio, Value
  d. Apply this logic onto dimension mdx
7. SentimentGoodRatio
  a. Default 0.5
  b. Relevant if Sentiment=Both to return X percent (0.xx) for good, the rest for bad
    i. Show slider to select is Sentiment='Both'. Show above slider Top (X) on the right, Bottom (Y) on the left. If slider in the middle X,Y=10
8. LinRegPeriodNum—number of periods to go back for linear regression calculation
  a. Caption—Predict by N periods back
  b. Default 6
  c. Show when CompareMethod
    i. LinRegRatio
    ii. LinRegDelta
    iii. LinRegForecastRatio
    iv. LinRegForecastDelta
9. ForecastPeriod—number of periods to go forward for linear regression calculation
  a. Caption—Predict N future period
  b. Default 1
  c. Show when CompareMethod
    i. LinRegForecastRatio
    ii. LinRegForecastDelta
10. Tuple1—source tuple to use for compare. Has another attribute 'Enabled'
  a. Caption—First value
  b. Show when CompareMethod
    i. TupleRatio
    ii. TupleDelta
  c. Show UI for selecting a data cell
11. Tuple2—the tuple to compare to when using tuple compare
  a. Caption—Second value
  b. Show when CompareMethod
    i. TupleRatio
    ii. TupleDelta
  c. Show UI for selecting a data cell
12. RatioFilterGood—value in percent (0.xx). Has another attribute 'Enabled'
  a. Caption—Ratio
  b. Add condition: N<=RatioFilter
  c. Divide by 100 to place in xml
  d. Show % after the text box
13. RatioFilterBad—value in percent. Has another attribute 'Enabled'
  a. Caption—Ratio
  b. Add condition: N>=RatioFilter
  c. Divide by 100 to place in xml
  d. Show % after the text box
14. DeltaFilterGood—value. Has another attribute 'Enabled'
  a. Caption—Difference
  b. Add condition: N<=DeltaFilter
15. DeltaFilterBad—value. Has another attribute 'Enabled'
  a. Caption—Difference
  b. Add condition: N>=DeltaFilter
16. ValueFilterGood—value. Has another attribute 'Enabled'
  a. Caption—Value
  b. Add condition: N>=ValueFilter
17. ValueFilterBad—value. Has another attribute 'Enabled'
  a. Caption—Value
  b. Add condition: N>=ValueFilter The following captions are not ambiguous as they are placed in context of other captions:
18. FilterByEmptiness—Drop down—still in filter section
  a. Caption—Find insights when
  b. PrevAndCurrent
    i. Caption—Previous and current values are not empty
  c. PrevXorCurrent
    i. Caption
      1. For 'Good'—Only previous value is empty
      2. For 'Bad'—Only current value is empty d. PrevOrCurrent
   i. Caption—Always
e. Default—PrevAndCurrent
19. PeriodBase—caption—Rank period
   a. CurrentPeriod—caption—'Current period'
   b. PrevPeriod—caption—'Previous period'
   c. CurrentPeriodInDays—caption—'Days in current period'
20. PermutationMax—maximum number of permutations
21. DimMax—max number of dimensions to use for permutations
22. DimFilterMax—number to be used by topcount\bottomcount dim filters
23. MeasuresFilterMax—number to be used by topcount\bottomcount for measures
24. AddAllMemberToPermutations
   a. Enumerator
      i. None—default
      ii. Slicers
      iii. All
25. PreferredLevelsTypes—type of preferred levels. These will not be filtered after the topcount (TBD)
26. DimRatioFilterGood—value in percent (0.xx). Has another attribute 'Enabled'
   a. Add condition: N<=RatioFilter
27. DimRatioFilterBad—value in percent. Has another attribute 'Enabled'
   a. Add condition: N>=RatioFilter
28. Title MDX
   a. Title mdx from which the server will construct the title for the VI
29. TreatZeroAsEmpty—boolean The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant datasets will be developed and the scope of the term dataset is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method for detecting at least one anomaly in a dataset, comprising:
   managing a dataset including a plurality of data entities each including at least one value;

receiving a semantic model that defines associations between two or more data entities;
forming a plurality of multi dimensional data instances, each multi dimensional data instance formed from at least one of a permutation and a combination of a set of data entities from the plurality of data entities according to the semantic model, and includes at least one new calculated value calculated from at least some of said set of data entities;
analyzing the multi dimensional data instances to detect at least one anomalous value, the anomalous value representing a statistically significant deviation according to a deviation requirement, of one or more values from a set of values of the multi dimensional data instances; and
providing the detected at least one anomalous value;
wherein forming the plurality of multi dimensional data instances comprises selecting the set of data entities from the dataset according to a ranking score assigned to respective data entities;
further comprising creating a combination and/or permutation and/or aggregation of data entities according to a ranking requirement.

2. The method of claim 1, wherein the forming is performed for a set of multi dimensional data instances, wherein all members of each set are formed using a common permutation and/or combination and/or aggregation of data entities, wherein each member of each set includes different values for the respective data entities, and wherein the analyzing is performed for each set to detect at least one anomalous value for each set.

3. The method of claim 1, wherein the analyzing is performed automatically at predefined events to monitoring for new at least one anomalous values.

4. The method of claim 1, further comprising:
instructing a rendering of a graphical user interface (GUI) for presentation on a display, the GUI presenting the detected at least one anomalous value.

5. The method of claim 1, further comprising:
receiving from a user during runtime, a selection of at least one data entity for use in the forming of the plurality of multi dimensional data instances.

6. The method of claim 5, wherein the selected at least one data entity is selected for a user provided period of time.

7. The method of claim 5, further comprising receiving a selection of at least one of the at least one anomalous value for follow up, and monitoring changes in the statistically significant deviation according to updates to the data entities.

8. The method of claim 1, wherein the semantic model defines one or more members selected from the group consisting of: aggregation of values of two or more data entities, hierarchical relationships between data entities, at least one attribute for respective data entities.

9. The method of claim 8, further comprising:
instructing a rendering of a GUI for presentation on a display, the GUI presenting the detected at least one anomalous value;
receiving from a user using the GUI, a hierarchical navigation selection to a relatively lower layer or a relatively higher layer of at least one of the presented at least one anomalous value; and
updating the rendering of the GUI to present another at least one anomalous value at the selected relatively lower layer or relatively higher layer.

10. The method of claim 9, wherein the hierarchical navigation selection is automatically determined by code according to a predefinition.

11. The method of claim 9, further comprising:
receiving a marking for at least one anomaly at a relatively lower layer indicative of an answer to a high level problem represented by the initial anomalies; and
automatically creating an association between the high level problem and the marked at least one anomaly representing the answer to the high level problem.

12. The method of claim 11, further comprising monitoring the marked at least one anomaly representing the answer to determine during changes to underlying values to determine whether the marked at least one anomaly represents a statistically significant answer or a statistical variation representing a false answer.

13. The method of claim 1, wherein the semantic model defines a desired or undesired state for absolute values or changes in values of data entities.

14. The method of claim 1, wherein the at least one anomalous value is detected based on a multi dimensional statistical distance according to a distance requirement, from at least a set of the plurality of multi dimensional data instances.

15. The method of claim 1, wherein the analyzing the multi dimensional data instances to detect at least one anomalous value is performed by determining the statistically significant deviation for a member selected from the group consisting of:
a certain multi dimensional data instance at a current period of time and at least some of the plurality of multi dimensional data instances at a previous period of time, a certain multi dimensional data instance at a current period of time and at least some of the plurality of multi dimensional data instances at a parallel corresponding period of time, a certain multi dimensional data instance at a forecasted period of time and at least some of the plurality of multi dimensional data instances at a current period of time, a certain multi dimensional data instance at a current period of time and at least some of the plurality of multi dimensional data instances at a current period of time that was previously forecasted.

16. The method of claim 1, wherein the analyzing the multi dimensional data instances to detect at least one anomalous value is performed by determining the statistically significant deviation for a certain multi dimensional data instance relative to at least some of other multi dimensional data instances according to a hierarchical association.

17. The method of claim 16, wherein the analyzing is iterated for each level of the hierarchical association, by determining the statistically significant deviation of the certain multi dimensional data instance relative to other multi dimensional data instances at the respective level and/or at one or more different levels.

18. The method of claim 1, wherein the analyzing the multi dimensional data instances to detect at least one anomalous value is performed for a certain multi dimensional data instance of a first type relative to other multi dimensional data instances of a second type, wherein the permutation and/or combination of data entities of the first type and second type are different, according to an association defined between the first type and the second type.

19. The method of claim 18, wherein the association between the first type and the second type is provided during runtime by a user.

20. The method of claim 1, wherein the at least one anomalous value is selected from a set of anomalous values according to a ranking of a calculated metric representing the amount of statistically significant deviation.

21. The method of claim 1, wherein the ranking score is assigned to an aggregation of two or more data entities.

22. The method of claim 1, wherein the ranking score is provided by a user during run time.

23. The method of claim 1, further comprising selecting at least one of the at least one anomalous value, and iterating the forming and the analyzing using data entities linked to data entities of the at least one anomalous value.

24. The method of claim 23, further comprising rendering a GUI for navigating between the anomalous value according to the links.

25. A computer implemented method for detecting at least one anomaly in a dataset, comprising:
 managing a dataset including a plurality of data entities each including at least one value;
 receiving a semantic model that defines associations between two or more data entities;
 forming a plurality of multi dimensional data instances, each multi dimensional data instance formed from at least one of a permutation and a combination of a set of data entities from the plurality of data entities according to the semantic model, and includes at least one new calculated value calculated from at least some of said set of data entities;
 analyzing the multi dimensional data instances to detect at least one anomalous value, the anomalous value representing a statistically significant deviation according to a deviation requirement, of one or more values from a set of values of the multi dimensional data instances; and
 providing the detected at least one anomalous value;
 wherein a respective ranking score is defined for at least one dimension of the multi dimensional data instances, wherein the at least one dimension of the multi dimensional data instances is prioritized according to the respective ranking score, and the plurality of multi dimensional data instances are formed according to the respective ranking scores of the each of the at least one dimension;
 wherein the formation of the multi dimensional data instances is iterated according to a subset of the highest or lowest ranked dimensions to identify another subset of anomalies.

26. The method of claim 25, wherein a predefined number of values are selected for each of the at least one dimension for forming the multi dimensional data instances.

27. A system for detecting at least one anomaly in a dataset, comprising:
 a program store storing code;
 a data repository storing a dataset including a plurality of data entities each including at least one value;
 a processor coupled to the data repository and to the program store for implementing the stored code, the code comprising:
 code to receive a semantic model that defines associations between two or more data entities;
 code to form a plurality of multi dimensional data instances, each multi dimensional data instance formed from at least one of a permutation and a combination of a set of data entities from the plurality of data entities according to the semantic model and includes at least one new calculated value calculated from at least some of said set of data entities, and analyze the multi dimensional data instances to detect at least one anomalous value, the anomalous value representing a statistically significant deviation according to a deviation requirement, of one or more values from a set of values of the multi dimensional data instances; and
 code to provide the detected at least one anomalous value;
 wherein forming the plurality of multi dimensional data instances comprises selecting the set of data entities from the dataset according to a ranking score assigned to respective data entities;
 wherein the code further comprises code to create a combination and/or permutation and/or aggregation of data entities according to a ranking requirement.

28. A computer program product comprising a non-transitory computer readable storage medium storing program code thereon for implementation by a processor of a system for detecting at least one anomaly in a dataset, comprising:
 instructions to manage a dataset including a plurality of data entities each including at least one value;
 instructions to receive a semantic model that defines associations between two or more data entities;
 instructions to form a plurality of multi dimensional data instances, each multi dimensional data instance formed from at least one of a permutation and a combination of a set of data entities from the plurality of data entities according to the semantic model, and includes at least one new calculated value calculated from at least some of said set of data entities;
 instructions to analyze the multi dimensional data instances to detect at least one anomalous value, the anomalous value representing a statistically significant deviation according to a deviation requirement, of one or more values from a set of values of the multi dimensional data instances; and
 instructions to provide the detected at least one anomalous value;
 wherein forming the plurality of multi dimensional data instances comprises selecting the set of data entities from the dataset according to a ranking score assigned to respective data entities;
 wherein the program code further comprises instructions to create a combination and/or permutation and/or aggregation of data entities according to a ranking requirement.

* * * * *